United States Patent
Wang et al.

(10) Patent No.: US 9,438,284 B2
(45) Date of Patent: Sep. 6, 2016

(54) NON-LINEAR INTERFERENCE CANCELLATION FOR MULTIPLE RECEIVER ANTENNAS

(71) Applicant: QUALCOMM Incorporated, San Diego, CA (US)

(72) Inventors: Jibing Wang, San Diego, CA (US); Roberto Rimini, San Diego, CA (US); Joseph Patrick Burke, Glenview, IL (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 14/070,919

(22) Filed: Nov. 4, 2013

(65) Prior Publication Data

US 2015/0126146 A1    May 7, 2015

(51) Int. Cl.
| | | |
|---|---|---|
| H04B 1/10 | (2006.01) | |
| H04B 1/12 | (2006.01) | |
| H04L 25/03 | (2006.01) | |

(52) U.S. Cl.
CPC ............ *H04B 1/1027* (2013.01); *H04B 1/126* (2013.01); *H04L 25/03305* (2013.01)

(58) Field of Classification Search
CPC combination set(s) only.
See application file for complete search history.

(56) References Cited

U.S. PATENT DOCUMENTS

| | | | |
|---|---|---|---|
| 6,516,183 B1* | 2/2003 | Hellmark | H03D 3/008 375/346 |
| 2002/0044614 A1* | 4/2002 | Molnar | H04B 1/0003 375/346 |
| 2012/0288039 A1 | 11/2012 | Kim et al. | |
| 2012/0294162 A1 | 11/2012 | Pajukoski et al. | |
| 2012/0294395 A1 | 11/2012 | Jones et al. | |
| 2013/0028305 A1 | 1/2013 | Gollakota et al. | |
| 2013/0044791 A1 | 2/2013 | Rimini et al. | |
| 2014/0057583 A1* | 2/2014 | Wang | H04B 17/0042 455/226.1 |
| 2014/0064350 A1* | 3/2014 | Krauss | H04B 7/0854 375/232 |

* cited by examiner

*Primary Examiner* — Junpeng Chen
(74) *Attorney, Agent, or Firm* — DeLizio Law, PLLC

(57) ABSTRACT

Various embodiments are disclosed for implementing joint non-linear interference cancellation (NLIC) in communication receivers with multiple receiver antennas to cancel or mitigate self-jamming interference from the same aggressor transmitter. A victim receiver may exploit the correlated nature of the interference signals received by the multiple receiver antennas to reduce the computational complexity of an NLIC scheme and improve performance. The victim receiver may select an Rx antenna/Rx chain that experiences the strongest interference from the aggressor transmitter and may perform a full NLIC operation using Tx data from the aggressor transmitter to estimate the strongest interference signal. The NLIC operation may estimate each remaining interference signal by applying a complex coefficient from a single-tap adaptive filter to the estimate of the strongest interference signal. The victim receiver may remove the estimated interference signals from the Rx signals of the respective Rx chains to cancel or mitigate the interference.

20 Claims, 4 Drawing Sheets

NON-LINEAR INTERFERENCE CANCELLATION FOR MULTIPLE RECEIVER ANTENNAS

TECHNICAL FIELD

Embodiments of the present disclosure generally relate to communication systems. In particular, this disclosure relates to cancelling self-jamming interference induced by a transmitter of a communication system on a receiver of the same communication systems when the receiver has multiple receiver antennas.

BACKGROUND

Wireless communication systems are widely deployed to provide various types of communication content such as voice, data, and so on. It is common to integrate multiple radios into a single communication device. For example, smartphones may have radios to support cellular communication, WiFi, GPS, and Bluetooth®, etc., with each radio operating on a different frequency band. A communication system may transmit (Tx) and receive (Rx) simultaneously on different frequency bands. Interference on an Rx signal of a victim receiver may be represented by leakage of Tx signals that are simultaneously transmitted by one or more aggressor transmitters of the same communication system, thus referred to as self-jamming interference. The Tx signals may leak to the Rx path through the finite isolation between the Tx and Rx paths of the communication system. For example, in a system containing a 3GPP Long Term Evolution (LTE) radio and a WiFi radio, non-linearities present in the transmitter chain, such as in an up-converter or a power amplifier (PA) of the LTE transmitter, may generate spectral re-growth of the LTE Tx signal that falls in the Rx frequency band of the WiFi receiver as a leakage signal. Even when the Tx leakage signal occupies a nominally different frequency band from the WiFi Rx signal, the Tx leakage signal may cause co-channel interference on the intended WiFi Rx signal due to non-linearities in the Rx chain. For example, non-linear behavior in the radio frequency (RF) down conversion components, e.g., non-linear excitation of low noise amplifiers (LNA), mixers, switches, filters, data converters, etc., operating on the Tx leakage signal may generate interference in the Rx frequency band. The effects of the self-jamming interference due to the non-linearities of the Tx or the Rx chains are degradation in the performance of the communication systems or even a reduction of coverage area.

In a communication system affected by self-jamming interference, the Tx waveforms that generate the interference may be known. Hence, the communication system may reconstruct the interference component of the Rx signal at the victim Rx chain via an adaptive non-linear interference cancellation (NLIC) scheme. For example, an NLIC module may generate, based on the known baseband Tx signal, an estimate of the interference signal component of the baseband Rx signal attributable to the Tx/Rx non-linearities. The Rx chain may remove the estimated interference signal component from the baseband Rx signal to cancel or to mitigate the self-jamming interference.

Often a receiver victimized by self-jamming interference may have multiple Rx chains each of which has an Rx antenna and an Rx front-end. For example, multiple-input multiple-output (MIMO) receivers or other receivers with antenna diversity have multiple Rx antennas. Each of the antennas may receive self-jamming interference from the same Tx interference signal source. For example, multiple antennas of a MIMO WiFi receiver may receive interference signals from an LTE transmitter co-located in the system. However, the characteristics of the self-jamming interference received by each of the Rx chains may be different due to differences in signal path, differences in antenna isolation from the Tx interference source to the each victim Rx antenna, and/or due to differences in device characteristics of the multiple Rx front-ends. The receiver may implement an NLIC module for each Rx chain to independently estimate the interference signal received by each Rx chain for interference cancellation. However, estimating the interference signals for the multiple Rx chains using independent NLIC modules increases complexity, cost, size, and power of the receiver. In addition, an Rx chain of the Rx antenna having a low level of interference may not accurately estimate the interference signal in the present of noise, thus negatively impacting receiver performance. The increased complexity, cost, and degraded performance may limit the implementation of the NLIC scheme in receivers with multiple Rx antennas or may restrict the ability of the receivers to scale up the number of antennas to increase throughput and performance.

SUMMARY

Various embodiments are disclosed for implementing joint non-linear interference cancellation (NLIC) in a communication receiver having multiple receiver antennas. The joint NLIC may be used to cancel or mitigate self-jamming interference from an aggressor transmitter co-located with the communication receiver. Self-jamming interference from an aggressor transmitter may arise when leakage Tx signals from the transmitter induce co-channel interference on the Rx signals received by multiple antennas (referred to as victim receivers). The interference may be generated by non-linearities in the Tx chain of the transmitter or in the Rx chains of the victim receivers. A victim receiver may exploit the correlated nature of the interference signals received by the multiple Rx antennas and processed by multiple Rx chains to reduce the computational complexity of an NLIC scheme. For example, the interference signals received at the multiple Rx antennas from the same aggressor transmitter may differ only in complex gain that represents the difference in amplitudes and/or phases of the interference signals caused by the different propagation paths from the aggressor transmitter to the Rx antennas. Similarly, non-linearities in the device characteristics of the multiple Rx chains operating on the leakage Tx signals may introduce interference signals in the multiple Rx chains that differ only in gain and/or phase.

In one embodiment, an apparatus may select an Rx antenna/Rx chain that experiences the strongest interference from the aggressor transmitter and may perform a full NLIC operation on the composite Rx plus interference signal for the selected Rx chain to estimate the strongest interference signal, thus achieving good accuracy in the estimation of the interference signal. The apparatus may remove the estimated interference signal from the composite Rx plus interference signal of the selected Rx chain experiencing the strongest interference to cancel or mitigate the interference. Because the interference signals on the other Rx chains may be correlated to the strongest interference signal on the selected Rx chain the estimated strongest interference signal may be reused for another Rx antenna/Rx chain. Prior to performing cancellation on the other Rx branches, the estimated strongest interference signal may be adjusted by applying a complex gain to the estimated strongest interference signal. For example, the NLIC operation may apply a single-tap adaptive filter to the estimated strongest interference signal to estimate a further interference signal on a second Rx chain. The apparatus may then remove the estimated further interference signal on the second Rx chain from the composite Rx plus interference signal of the second Rx chain to cancel or mitigate the interference. Operations to estimate the second or other interference signals from the strongest interference signal using a complex gain may be lower in complexity than performing a full scale NLIC operation for each Rx signal of the multiple Rx antennas/Rx chains. The adaptive process and the cost function for the single-tap adaptive filters are simpler and more flexible than those used in a full scale NLIC filter. Additional single-tap adaptive filter(s) may be added as the number of antennas in a receiver increases, thus enhancing performance without a concomitant increase in complexity required to mitigate self-jamming interference.

In one embodiment, a method for joint NLIC of interference signals received by multiple victim receivers from a common aggressor transmitter is disclosed. The method includes receiving a composite Rx signal from each victim receiver. The composite Rx signal for each victim receiver includes a desired Rx signal and an interference signal from the aggressor transmitter. The method also includes selecting a strongest interference signal among the interference signals for the multiple victim receivers. The method further includes receiving the transmitted signal from the aggressor transmitter. The method further includes adaptively generating an estimate of the strongest interference signal from transmitted Tx signal of the aggressor transmitter. The method further includes adaptively generating an estimate of at least one additional interference signal from the estimate of the strongest interference signal. The method further includes removing the estimate of the strongest interference signal from the corresponding composite Rx signal containing the strongest interference signal. The method further includes removing the estimate of the additional interference signal from the corresponding composite Rx signal containing the additional interference signal.

In another embodiment, an apparatus for NLIC of interference signals received by multiple receiver antennas from a common aggressor transmitter is disclosed. The apparatus includes a memory and one or more processors that execute instructions read from the memory. The processors execute the instructions to receive composite Rx signals from the multiple receiver antennas. The composite Rx signal received from each receiver antenna includes a desired Rx signal and an interference signal from the aggressor transmitter. The processors also execute the instructions to select a strongest interference signal among the interference signals for the multiple receiver antennas. The processors further execute the instructions to receive a Tx signal from the aggressor transmitter. The processors further execute the instructions to adaptively generate an estimate of the strongest interference signal from the Tx signal of the aggressor transmitter. The processors further execute the instructions to adaptively generate an estimate of at least one additional interference signal from the estimate of the strongest interference signal. The processors further execute the instructions to remove the estimate of the strongest interference signal from the corresponding composite Rx signal containing the strongest interference signal. The processors further execute the instructions to remove the estimate of the additional interference signal from the corresponding composite Rx signal containing the additional interference signal.

In another embodiment, a non-transitory machine-readable medium that stores machine-readable instructions is disclosed. One or more processors may execute the instructions to perform steps for NLIC of interference signals received by multiple victim receivers from a common aggressor transmitter. The instructions include receiving a composite Rx signal from each victim receiver. The composite Rx signal for each victim receiver includes a desired Rx signal and an interference signal from the aggressor transmitter. The instructions also include selecting a strongest interference signal among the interference signals for the multiple victim receivers. The instructions further include receiving a Tx signal from the aggressor transmitter. The instructions further include adaptively generating an estimate of the strongest interference signal from the Tx signal of the aggressor transmitter. The instructions further include adaptively generating an estimate of at least one additional interference signal from the estimate of the strongest interference signal. The instructions further include removing the estimate of the strongest interference signal from the corresponding composite Rx signal containing the strongest interference signal. The instructions further include removing the estimate of the additional interference signal from the corresponding composite Rx signal containing the additional interference signal.

In another embodiment, a system for NLIC of interference signals received by multiple receiver antennas from a common aggressor transmitter is disclosed. The system includes means for receiving composite Rx signals from the multiple receiver antennas. The composite Rx signal received from each receiver antenna includes a desired Rx signal and an interference signal from the aggressor transmitter. The system also includes means for selecting a strongest interference signal among the interference signals for the multiple receiver antennas. The system further includes means for receiving a Tx signal from the aggressor transmitter. The system further includes means for adaptively generating an estimate of the strongest interference signal from the Tx signal of the aggressor transmitter. The system further includes means for adaptively generating an estimate of at least one additional interference signal from the estimate of the strongest interference signal. The system further includes means for removing the estimate of the strongest interference signal from the corresponding composite Rx signal containing the strongest interference signal. The system further includes means for removing the estimate of the additional interference signal from the corresponding composite Rx signal containing the additional interference signal.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
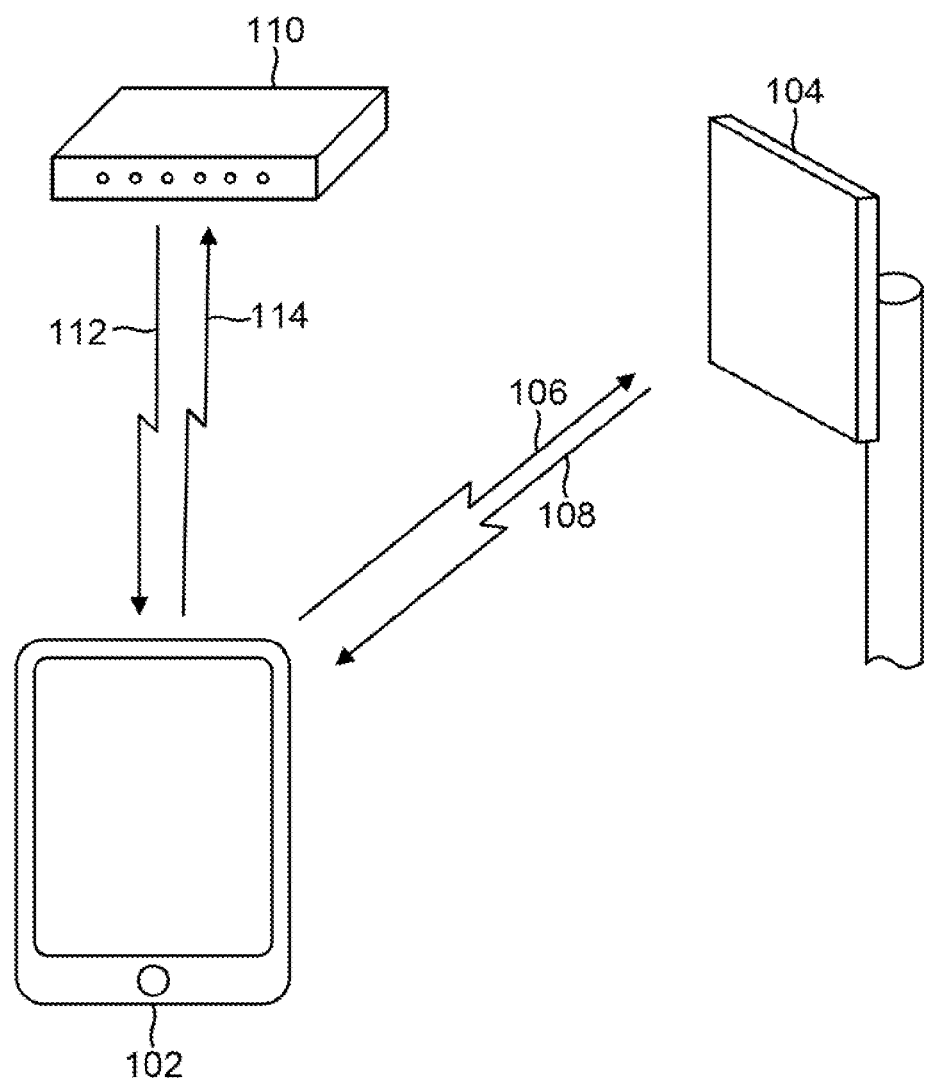
FIG. 1 shows multiple radios operating in a communication system in which joint non-linear interference cancellation of self-jamming interference signals for multiple receiver antennas may be implemented according to one or more embodiments of the present disclosure.

Various embodiments are disclosed for implementing joint non-linear interference cancellation (NLIC) operations by multiple victim receiver antennas of a communication system to mitigate self-jamming interference from a same aggressor transmitter. A communication system may have multiple victim receivers each of which has an Rx antenna and an Rx chain in which leakage Tx signals from a transmitter induce self-jamming interference on intended Rx signals of the multiple victim receivers. For example, a MIMO WiFi transceiver having multiple receivers with antennas may receive Rx signals on the same frequency. Each antenna may receive a self-jamming interference signal from a Tx leakage signal of a LTE transmitter. The interference signals may contain the spectral re-growth of the Tx signal transmitted from the LTE transmitter. The interference signals received by the multiple Rx antennas may be of different power and may fall within the frequency band of the intended Rx signals of the multiple victim receivers. However, the interference signals received by the multiple Rx antennas may differ only in complex gain that represents the amplitude and phase of the interference signals introduced by the different propagation paths from the aggressor transmitter to the Rx antennas. Similarly, non-linearities in the device characteristics of the multiple Rx chains operating on the Tx leakage signals may introduce interference signals in the multiple Rx chains that differ only in gain and/or phase. For example, low noise amplifiers (LNA) or down-converters in multiple Rx chains may exhibit similar non-linearity characteristics except for the amplitude and/or phase of the non-linear distortions.

The victim receivers may exploit the highly correlated nature of the interference signals by selecting an Rx antenna/Rx chain that experiences the strongest interference (e.g. an antenna experiencing/receiving a strongest estimated interference signal power) from the aggressor transmitter and performing a full NLIC operation on the Rx signal received by the selected Rx chain to estimate the interference signal. In other embodiments, an Rx antenna/Rx chain that experiences the highest ratio of an estimated interference signal power over the intended Rx signal power plus the noise (I/(S+N)) may be selected. The NLIC operation may adaptively generate a set of complex weights that are applied to polynomial terms mimicking non-linear components of the Tx leakage signal to estimate the interference signal received by the selected Rx chain. The victim receiver may remove the estimated interference signal from the Rx signal of the selected Rx chain experiencing the strongest interference to cancel or mitigate the interference.

Because the interference signals on the other Rx chains may differ from the strongest interference signal received by the selected Rx chain in only gain and/or phase, the joint NLIC operation may estimate the other interference signals by applying a complex gain to the estimate of the strongest interference signal. For example, the joint NLIC operation may apply a single-tap adaptive filter to the estimate of the interference signal received by the selected Rx chain to estimate the interference signal on a second Rx chain. The single-tap adaptive filter has a single complex coefficient that compensates for the amplitude/phase mismatch between the interference signals on the two Rx chains. The victim receiver may then remove the estimated interference signal received by the second Rx chain from the Rx signal of the second Rx chain to cancel or mitigate the interference.

The joint NLIC operation may similarly estimate the remaining interference signals using other single-tap adaptive filters that operate on the estimate of the strongest interference signal and may remove the estimated interference signals received by the remaining Rx chains from the Rx signals of the corresponding Rx chains. The Rx chain receiving the strongest interference signal may be selected based on the received signal strength indicator (RSSI) or based on estimated antenna isolation data. For example, during a quiet period when the victim receivers are not receiving data, each Rx chain may measure the RSSI of the interference signal from the aggressor transmitter received by the corresponding Rx antenna. The Rx chain that has the highest RSSI of the interference signal may be selected as the Rx chain receiving the strongest interference power. The interference signal for the selected Rx chain receiving the strongest interference power may be estimated by the NLIC module first. In one or more embodiments, multiple Rx chains may estimate the expected level of interference on the Rx chains using calibrated data on antenna isolation between the aggressor transmitters and the Rx antennas. The Rx chain with the smallest antenna isolation data may be selected because it is expected to receive the strongest interference signal. The interference signal for the selected Rx chain may be estimated by the NLIC module first.

For example, for the MIMO WiFi transceiver receiving interference signals from the LTE transmitter, the multiple Rx chains of the MIMO WiFi transceiver may perform a joint NLIC operation. The joint NLIC operation may reconstruct the strongest interference signal received by the multiple Rx chains using the known LTE Tx signal and may reconstruct the other interference signals from the reconstruction of the strongest interference signal. The Rx chains may remove the reconstructed interference signals received by the Rx chains from the WiFi Rx signals for the corresponding Rx chains to cancel the interference signals. The MIMO WiFi transceiver may select the strongest interference signal based on measured data such as RSSIs or calibration of signal isolation from the LTE transmitter to the antennas of the MIMO WiFi transceiver. The MIMO WiFi transceiver may also use information received from the LTE transmitter such as information on the power of the LTE transmitter, and information on the center frequency and bandwidth of the LTE Tx signal.

More generally, an aggressor transceiver of a communication system may include a digital backend that generates a Tx signal in baseband and an analog frontend that generates the Tx signal in RF from the baseband Tx signal. The RF Tx signal may leak to multiple victim transceivers of the communication system through finite isolation between the aggressor transceiver and the victim transceivers (e.g., through duplexer, antenna coupling, circuit electromagnetic interference (EMI), ground coupling). Each victim transceiver may include an analog frontend that receives a composite RF signal comprising the desired Rx signal in an Rx frequency band and the RF Tx leakage signal from aggressor transceiver. Self-jamming interference from the RF Tx leakage signal may arise when non-linearities in the RF Tx components of the analog frontend of the aggressor transceiver generate spectral re-growth of the RF Tx signal that overlaps with the Rx frequency band of the victim transceivers. For example, a third harmonic distortion (H3D) of the Tx carrier signal $f_0$ from an RF up-converter of the aggressor transceiver may introduce spectral sideband at $3f_0$, which may fall in the Rx frequency band of the victim transceivers.

Even if the RF Tx leakage signal is in a different frequency band from the Rx frequency band of the victim transceivers, non-linearities in the RF components of the analog frontend of the victim transceivers operating on the RF Tx leakage signal may generate co-channel interference in the Rx frequency band. For example, $2^{nd}$ order intermodulation (IM2) distortion of the RF Tx leakage signal in a RF down-converter of the victim transceivers may introduce interference to the desired RF signal. If there is an additional external narrowband jamming signal, cross modulation of the RF Tx leakage signal with the jamming signal in the RF down-converter may also cause interference.

The interference signals may appear with the desired Rx signal for each victim transceiver in a composite digital baseband Rx signal from the output of the analog frontend of the victim transceiver. A digital backend of the victim transceivers may receive the composite digital baseband Rx signals from the multiple victim transceivers to demodulate and decode the desired Rx signals. The interference signals reduce the signal to interference and noise ratio of the desired Rx signals, degrading performance of the victim transceiver, causing a decrease in throughput, and increasing the likelihood of a failed communication link.

To cancel or mitigate the interference signals due to the Tx leakage signal from the aggressor transceiver, the digital backend of the victim transceivers may receive the Tx signal from the aggressor transceiver as a digital baseband signal. The digital baseband Tx signal may be generated from the digital backend of the aggressor transceiver. The RF Tx signal from the analog frontend of the aggressor transceiver may be generated from the digital baseband Tx signal through digital-to-analog conversion and baseband-to-RF up-conversion. The digital backend of the victim transceiver may receive the digital baseband Tx signal from the aggressor transceiver as well as the composite digital baseband Rx signals from the analog frontend of each victim transceiver. The composite digital baseband Rx signal for a victim transceiver includes the desired Rx signal and the interference signal from the aggressor transceiver.

The digital backend of the victim transceiver may remove the interference signals by adaptively estimating the non-linear interference signals in a joint NLIC operation using the digital baseband Tx signal from the aggressor transceiver. For example, the joint NLIC operation may first estimate the strongest interference signal received by the multiple Rx transceivers using the digital baseband Tx signal and may estimate the other interference signals from the estimate of the strongest interference signal. The digital backend may remove the estimated interference signal received by an Rx chain from the corresponding composite digital baseband Rx signal for the Rx chain to cancel the interference signal. The joint NLIC operation for the strongest interference signal may be implemented in a digital adaptive filter that applies a set of complex weights to polynomial terms representing non-linear distortion of the digital baseband Tx signal to construct an estimate of the strongest interference signal. The joint NLIC operation may estimate the remaining interference signals in single-tap adaptive filters that operate on the estimate of the strongest interference signal to compensate for the difference in complex gain between the strongest interference signal and the other interference signals.

The digital backend of the victim transceiver may remove the estimate of the strongest interference signal from the composite digital baseband Rx signal for the victim transceiver receiving the strongest interference signal. Similarly, the digital backend may remove the estimate of the interference signals received by the other victim transceivers from the corresponding composite digital baseband Rx signals of the victim transceivers. The removal of an estimated non-linear interference signal from a composite baseband digital Rx signal may generate a residual interference signal. The residual interference signal may be minimized using a minimum square error (MSE) algorithm to adjust the complex weights of the adaptive filters to generate an estimate of the non-linear interference signal that closely approximates the received non-linear interference signal present in the corresponding composite digital baseband Rx signal. For estimating the interference signals other than the strongest interference signal, other adaptive algorithm and cost function may be used to adjust the single complex coefficient of the single-tap adaptive filters.

FIG. 1 shows multiple radios operating in a communication system in which joint non-linear interference cancellation of self-jamming interference signals for multiple receiver antennas may be implemented according to one or more embodiments of the present disclosure. A user terminal 102 communicates with a base station 104 over a first wireless network. User terminal 102 may be a smartphone, a tablet computer, a personal digital assistant (PDA), a notebook computer, a laptop, or other communication and/or computing devices. User terminal 102 may be stationary, portable, or mobile. User terminal 102 may also be referred to as a user equipment, a subscriber unit, a user node, a mobile station, or using other terminology. Base station 104 may be a base station in a cellular network, an access point (AP) in a WiFi network, or other stationary, portable, or mobile communication terminals. The first wireless communication network over which user terminal 102 and base station 104 communicate may be a multiple access network, a point-to-point network, a mesh network, etc. Examples of multiple access networks may include Code Division Multiple Access (CDMA), Time Division Multiple Access (TDMA), Frequency Division Multiple Access (FDMA), Orthogonal Frequency Division Multiple Access (OFDMA), etc., that are found in cellular, wide-area network (WAN), local-area network (LAN), personal-area network (PAN), etc. Systems and methods for NLIC discussed here may also be applicable to GPS, UWB, RFID, or wired communication systems such as Ethernet, cable, fiber, power-line, etc. User terminal 102 transmits data to base station 104 over an uplink channel 106 of the first wireless network. Base station 104 transmits data to user terminal 102 over a downlink channel 108 of the first wireless network.

User terminal 102 also communicates with an access point 110 over a second wireless network. Similar to base station 104, access point 110 may be a base station in a cellular network, an AP in a WiFi network, or other stationary, portable, or mobile communication terminals. Also similar to the first wireless network, the second wireless network may be a multiple access network, a point-to-point network, a mesh network, etc. User terminal 102 has multiple antennas for communicating with access point 110. For example, user terminal 102 may be a MIMO WiFi transceiver that transmits uplink Tx signals to access point 110 over multiple uplink channels 114. The multiple antennas on user terminal 102 may also receive data from access point 110 over multiple downlink channels 112. User terminal 102 may transmit data over uplink channel 106 of the first wireless network while simultaneously receiving data over multiple downlink channels 112 of the second wireless network. Self-jamming interference in user terminal 102 may occur when non-linearities in the Tx path or Rx processing of user terminal 102 cause Tx signals of uplink channel 106 to generate co-channel interfere in the Rx frequency band of multiple downlink channels 112.

Figure 2:
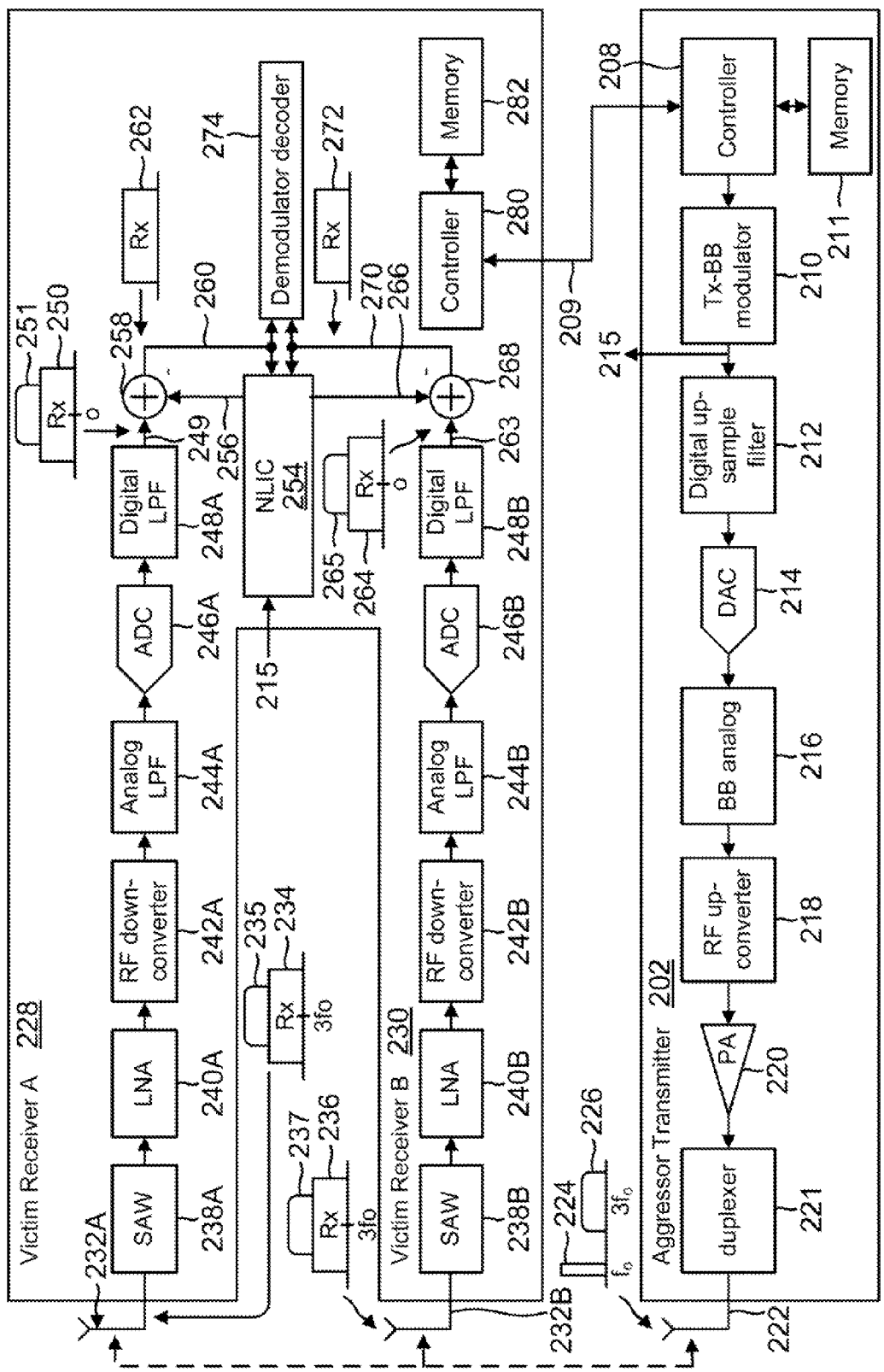
FIG. 2 shows a system block diagram of an aggressor transmitter and two victim receivers of a communication system in which self-jamming interference signals from the aggressor transmitter are received by the two victim receivers and in which the two victim receivers jointly implement an NLIC module using a baseband Tx signal from the aggressor transmitter to mitigate the interference signals according to one or more embodiments of the present disclosure.

FIG. 2 shows a system block diagram of an aggressor transmitter and two victim receivers of a communication system in which self-jamming interference signals from the aggressor transmitter are received by the two victim receivers and in which the two victim receivers jointly implement an NLIC module using a baseband Tx signal from the aggressor transmitter to mitigate the interference signals according to one or more embodiments of the present disclosure. The communication system of FIG. 2 may be found in user terminal 102 of FIG. 1.

The communication system includes an aggressor transmitter 202, and two victim receivers—victim receiver A 228 and victim receiver B 230. Aggressor transmitter 202 may be the transmitter of a LTE transceiver. In one or more embodiments, aggressor transmitter 202 may transmit over an uplink carrier of an LTE system. Victim receiver A 228 and victim receiver B 230 may be two receivers of a MIMO WiFi transceiver that receive data over two WiFi downlink channels. It should be understood that in some embodiments, the communication system may include more than two victim receivers.

Aggressor transmitter 202 includes a controller 208, a Tx baseband (Tx-BB) modulator 210, a digital up-sample filter 212, and a digital-to-analog converter (DAC) 214 in a digital backend. Tx-BB modulator 210 may perform coding, interleaving, and modulation, etc., of data from one or more data sources to generate digital baseband Tx data 215 under control of a controller 208. Controller 208 may execute instructions stored in a memory 211 to control the generation of digital baseband Tx data 215. Digital baseband Tx data 215 may be routed as Tx data of aggressor transmitter 202 to a joint NLIC 254 associated with victim receiver A 228 and victim receiver B 230 for the two victim receivers to reconstruct the interference signals from aggressor transmitter 202 in a joint NLIC operation. In addition, digital up-sample filter 212 up-samples and filters digital baseband Tx data 215 for DAC 214 to convert digital baseband Tx data 215 to an analog baseband Tx signal. In one or more embodiments, the analog signal from DAC 214 may be at an intermediate frequency (IF) if digital up-sample filter 212 digitally up-converts digital baseband Tx data 215 to the IF.

An analog frontend of aggressor transmitter 202 receives and up-converts the analog baseband Tx signal to an RF Tx signal 224 for transmission over a Tx channel. The analog frontend includes a baseband (BB) analog module 216, an RF up-converter 218, a power amplifier (PA) 220, and a duplexer 221. BB analog module 216 filters, amplifies, and conditions the analog baseband Tx signal to generate a signal suitable for transmission over the Tx channel. In one or more embodiments, BB analog module 216 may further condition the analog baseband Tx signal for beam-forming RF up-converter 218 up-converts the Tx signal from BB analog module 216 from the baseband or an IF to the RF frequency band of RF Tx signal 224. RF up-converter 218 may perform the up-conversion using a single-stage mixer or a multi-stage up-conversion process involving several mixers and one or more IFs. RF Tx signal 224 may occupy the full bandwidth of the Tx channel or may only occupy one or more sub-bands of the Tx channel. PA 220 amplifies the RF output of RF up-converter 218 to a desired power level and the amplified RF signal is switched through duplexer 221 for transmission through an antenna 222 as RF Tx signal 224. Operation of the analog frontend may also be under the control of controller 208. For example, controller 208 may determine the RF frequency band of the Tx channel or one or more sub-bands within the Tx channel occupied by RF Tx signal 224, and/or the power level of RF Tx signal 224.

Non-linearities in BB analog modules 216, RF up-converters 218, PA 220, and/or duplexers 221 may generate spectral re-growth of RF Tx signal 224 that overlaps with the Rx frequency bands of signals received by victim receiver A 228 and victim receiver B 230. For example, non-linearities in the amplifier or filter of BB analog modules 216, in one or more mixers of RF up-converters 218, and/or in the operating characteristics of PA 220 may introduce spectral re-growth in the RF Tx signals 224. Specifically, linearities in PA 220 are a function of current consumption and the linear operating range of PA 220 may be reduced to obtain savings in power, area, and/or cost when performing the design trade-off of the analog frontend of aggressor transmitter 202. The result of the design trade-off may be to allow for some spectral re-growth when PA 220 is operated over the non-linear region. In one or more embodiments, if RF Tx signal 224 has a RF carrier frequency of $f_0$, the third harmonic distortion (H3D) of RF Tx signal 224, labeled as H3D signal 226, may introduce undesired energy at 3 $f_0$, which may fall in the Rx frequency band of RF Rx signal 234 received by victim receiver A 228 as interference signal 235. Similarly, H3D signal 226 may fall in the Rx frequency band of RF Rx signal 236 received by victim receiver B 230 as interference signal 237. Other $m^{th}$ harmonic distortions of RF Tx signals 224 may similarly introduce undesired energy at frequencies that are $m^{th}$ multiples of $f_0$, the cancellation of which also falls under the scope of the present disclosure.

Victim receiver A 228 receives RF Rx signal 234 that is the desired Rx signal centered at Rx carrier frequency $f_{Rx}$ of 3 $f_0$ through antenna 232A. Similarly, victim receiver B 230 receives RF Rx signal 236 that is the desired Rx signal centered at 3 $f_0$ through antenna 232B. In one or more embodiments, the Rx carrier frequencies of RF Rx signal 234 and RF Rx signal 236 may be different if the Rx channels for the two receivers occupy different frequency bands. Victim receiver A 228 may receive self-jamming interference signal 235 in its Rx frequency band due to H3D signal 226 (the H3D of RF Tx signal 224) through antenna 232A. Similarly, victim receiver B 230 may receive interference signal 237 in its Rx frequency band due to H3D signal 226 through antenna 232B. Interference signals 235 and 237 are received as Tx leakage signals of H3D signal 226 due to finite antenna isolation from antenna 222 of aggressor transmitter 202 to antennas 232A and 232B of the victim receivers, respectively. Due to differences in antenna isolation and in leakage paths between aggressor transmitter 202 and the two victim receivers, interference signals 235 and 237 may differ in gain and/or phase. For example, interference signal 235 may have a stronger interference level than interference signal 237. A joint NLIC operation of the victim receivers may estimate the stronger interference signal to cancel or mitigate the interference on the victim receiver receiving the stronger interference signal first followed by estimating and removing the weaker interference signal from the other victim receiver.

An analog frontend of victim receiver A 228 processes RF Rx signal 234 and interference signal 235. The analog frontend includes a surface acoustical wave (SAW) filter 238A, a low noise amplifier (LNA) 240A, an RF down-converter 242A, an analog low pass filter (LPF) 244A, and an analog-to-digital converter (ADC) 246A. Received RF Rx signal 234 and interference signal 235 are filtered by SAW filter 238A and amplified by LNA 240A. RF down-converter 242A down-converts the filtered and amplified Rx signal and interference signal from the RF frequency band (e.g., Rx carrier frequency $f_{Rx}$ of 3 $f_0$) down to baseband. RF down-converter 242A may perform the down conversion from RF to baseband using a single-stage mixer or through a multi-stage down-conversion process involving several mixers and one or more IFs. Analog LPF 244A filters, amplifies, and otherwise conditions the baseband signal from RF down-converter 242A and outputs an analog composite baseband Rx signal. ADC 246A digitizes the analog composite baseband Rx signal from analog LPF 244A to a digital baseband signal. In one or more embodiments, analog LPF 244A may output an analog composite Rx signal at IF and ADC 246A may further down-convert and digitize the analog composite Rx signal to a digital baseband signal. An analog frontend of victim receiver B 230 similarly processes RF Rx signal 236 and interference signal 237 to output an digital composite Rx signal that includes the intended Rx signal and its interference component. The processing components of the analog frontend of victim receiver B 230 are the same as those of victim receiver A 228 and are referenced using the same reference labels as those for victim receiver A 228 but with the "A" suffix replaced by "B."

Non-linearities in the Rx signal processing chain of the analog frontend of victim receiver A 228 and victim receiver B 230 may generate co-channel interference even if RF Tx signal 224 does not have spectral re-growth that overlaps with the Rx frequency bands of RF Rx signals 234 and 236 centered at $f_{Rx}$. For example, IM2 distortion of one or more mixers of RF down-converters 242A/242B operating on leakage of RF Tx signal 224 may introduce an interference component to the baseband Rx signals from the analog frontend of the two victim receivers. RF Tx signal 224 may leak to victim receiver A 228 and victim receiver B 230 due to the large difference in signal power between RF Tx signal 224 and RF Rx signals 234/236 and due to limited isolation between aggressor transmitter 202 and the two victim receivers. In one or more embodiments, non-linearities in SAW filters 238A/238B, in LNAs 240A/240B, and/or in analog LPFs 244A/244B operating on the leakage of RF Tx signal 224 may also cause co-channel interference on the intended Rx signals.

The digital baseband signal from ADC 246A is further filtered by a digital LPF 248A to generate a composite signal 249 that contains a desired baseband Rx signal 250 for victim receiver A 228 and an interference baseband signal 251. Similarly, the digital baseband signal from ADC 246B is filtered by a digital LPF 248B to generate a composite signal 263 that contains a desired baseband Rx signal 264 for victim receiver B 230 and an interference baseband signal 265. Interference baseband signals 251 and 265 are the baseband version of interference signals 235 and 237, respectively.

A joint NLIC module 254 reconstructs interference baseband signals 251 and 265 by adaptively estimating the interference signals using digital baseband Tx data 215 from aggressor transmitter 202. Joint NLIC module 254 may select the stronger power of the two RF interference signals 235 and 237 as the first signal for which to estimate the interference level at baseband. The stronger interference signal power may be selected based on the RSSI of the interference signals or based on calibrated antenna isolation data. In various embodiments, joint NLIC module 254 may select one of two RF interference signals 235 and 237 having a highest ratio of an estimated interference signal power over intended signal power plus noise (I/(S+N)).

Joint NLIC module 254 estimates the interference signal at baseband for the antenna having the strongest interference signal power and removes the estimate of the stronger interference signal from the composite signal of the corresponding victim receiver to cancel or mitigate the interference. A controller 280 may measure the RSSI of interference signals 235 and 237 or may calibrate antenna isolation between antenna 222 of aggressor transmitter 202 and antennas 232A/232B of the two victim receivers. Controller 280 may select one of the interference signals 235, 237 having the stronger power as an interference signal to estimate and remove first based on RSSI measurements.

In one or more embodiments, controller 280 may select the interference signal expected to have the stronger interference level (i.e. strongest interference signal power) based on the antenna calibration data. In one or more embodiments, if the Rx carrier frequencies $f_{Rx}$ or the occupied bandwidth of RF Rx signals 234 and 236 of the two victim receivers are different, the expected levels of interference from interference signals 235 and 237 may depend on such additional factors as the power level of RF Tx signal 224 transmitted from aggressor transmitter 202, the center frequency and bandwidth of RF Tx signal 224, etc. Victim receiver A 228 and victim receiver B 230 may receive the transmitted power level of RF Tx signal 224, Tx carrier frequency (e.g., $f_0$), Tx sub-bands used, and configuration information of the analog frontend of aggressor transmitter 202, etc., through data bus 209 from aggressor transmitter 202.

In one embodiment, calibration data may be used to select which antenna may receive the strongest interference signal. To calibrate the antenna isolation information, victim receiver A 228 and victim receiver B 230 may measure the RSSI of interference signals 235 and 237, respectively, from aggressor transmitter 202 during a quiet period when the two victim receivers do not receive any RF Rx signals 234 and 236. If the Rx carrier frequencies $f_{Rx}$ and the occupied bandwidth of the RF Rx signals 234 and 236 of the two victim receivers are the same, controller 280 may select the interference signal for the victim receiver with the smaller antenna isolation as the stronger interference signal to estimate and remove by joint NLIC module 254 first. If the Rx carrier frequencies $f_{Rx}$ or the occupied bandwidth of RF Rx signals 234 and 236 of the two victim receivers are different, controller 280 may select the stronger interference signal based on the antenna isolation data, Rx carrier frequencies $f_{Rx}$ and the bandwidth of RF Rx signals 234 and 236 of the two victim receivers, and the transmitted power level, Tx carrier frequency and Tx bandwidth of RF Tx signal 224, etc., from aggressor transmitter 202.

If victim receiver A 228 receives the stronger interference signal 235, joint NLIC module 254 estimates interference baseband signal 251 as a weighted sum of polynomial terms of digital baseband Tx data 215. Thus, joint NLIC module 254 applies a non-linear distortion to the Tx signal from aggressor transmitter 202 to construct an estimate of the interference caused by the Tx signal. The polynomial terms are weighed by weight estimates from an adaptive filter and summed to generate an estimated interference baseband signal 256 for victim receiver A 228. A summer 258 subtracts estimated interference baseband signal 256 from composite signal 249 that contains desired baseband Rx signal 250 and interference baseband signal 251 to cancel or mitigate interference baseband signal 251. Summer 258 generates a composite signal 260 that contains desired baseband Rx signal 250 and a residual 262 of interference baseband signal 251 after the NLIC operation. Joint NLIC module 254 may minimize residual 262 using a minimum square error (MSE) algorithm to adaptively generate the weight estimates of the adaptive filter. Thus, joint NLIC module 254 adaptively generates estimated interference baseband signal 256 that closely approximates interference baseband signal 251 to remove or mitigate interference baseband signal 251.

Alternatively, if victim receiver B 230 receives the stronger interference signal 237, joint NLIC module 254 estimates interference baseband signal 265 as a weighted sum of polynomial terms of digital baseband Tx data 215. The polynomial terms are similarly weighed by weight estimates from an adaptive filter and summed to generate an estimated interference baseband signal 266 for victim receiver B 230. A summer 268 subtracts estimated interference baseband signal 266 from composite signal 263 that contains desired baseband Rx signal 264 and interference baseband signal 265 to cancel or mitigate interference baseband signal 265. Summer 268 generates a composite signal 270 that contains desired baseband Rx signal 264 and a residual 272 of interference baseband signal 265 after the NLIC operation. Joint NLIC module 254 may minimize residual 272 using a minimum square error (MSE) algorithm to adaptively generate the weight estimates of the adaptive filter. Thus, joint NLIC module 254 adaptively generates estimated interference baseband signal 266 that closely approximates interference baseband signal 265 to remove or mitigate interference baseband signal 265.

In an alternative embodiment, as before, a joint NLIC module 254 reconstructs interference baseband signals 251 and 265 by adaptively estimating the interference signals using digital baseband Tx data 215 from aggressor transmitter 202. The joint NLIC module 254 may send the Rx signals 249 and 263 to an interference over signal plus noise (Interference/(signal+noise) or simply I/(S+N)) estimator. Joint NLIC module 254 may then use the higher ISNR estimate to select which of the two Rx signals 249 or 263 to use to estimate the interference level at baseband. Then, as before, joint NLIC module 254 estimates the stronger interference signal at baseband and removes the estimate of the stronger interference signal from the composite signal of the corresponding victim receiver to cancel or mitigate the interference. A controller 208 may provide the timing to allow for the measurements of interference plus signal plus noise, and signal plus noise, at appropriate times.

After removing or mitigating the stronger interference baseband signal, joint NLIC module 254 estimates a weaker interference baseband signal from the estimate of the stronger interference baseband signal. Because interference signals 235 and 237 of the two victim receivers may differ in only gain and/or phase, joint NLIC module 254 may adaptively apply a complex coefficient to the estimate of the stronger interference baseband signal to generate the estimate of the weaker interference baseband signal. The complex coefficient has a gain and a phase to compensate for the amplitude/phase mismatch between the two interference signals and to compensate for the difference in non-linearity behavior in the Rx chains of the RF frontend of the two victim receivers. The complex coefficient may be generated by a single-tap adaptive filter. For example, if interference signal 235 received by victim receiver A 228 is the stronger interference signal, joint NLIC module 254 may generate estimated interference baseband signal 266 from estimated interference baseband signal 256 using a single-tap adaptive filter. Alternatively, if interference signal 237 received by victim receiver B 230 is the stronger interference signal, joint NLIC module 254 may generate estimated interference baseband signal 256 from estimated interference baseband signal 266 using a single-tap adaptive filter.

A demodulator-decoder module 274 demodulates, de-interleaves, and decodes composite signal 260 that contains desired baseband Rx signal 250 to receive Tx data received by victim receiver A 228 under the control of controller 280. Similarly, demodulator-decoder module 274 demodulates, de-interleaves, and decodes composite signal 270 that contains desired baseband Rx signal 264 to receive Tx data received by victim receiver B 230. Controller 280 may execute instructions stored in a memory 282 to configure demodulator-decoder module 274 with Tx parameters such as the coding scheme, coding rate, modulation scheme, etc., used to code and modulate the Tx data.

Figure 3:
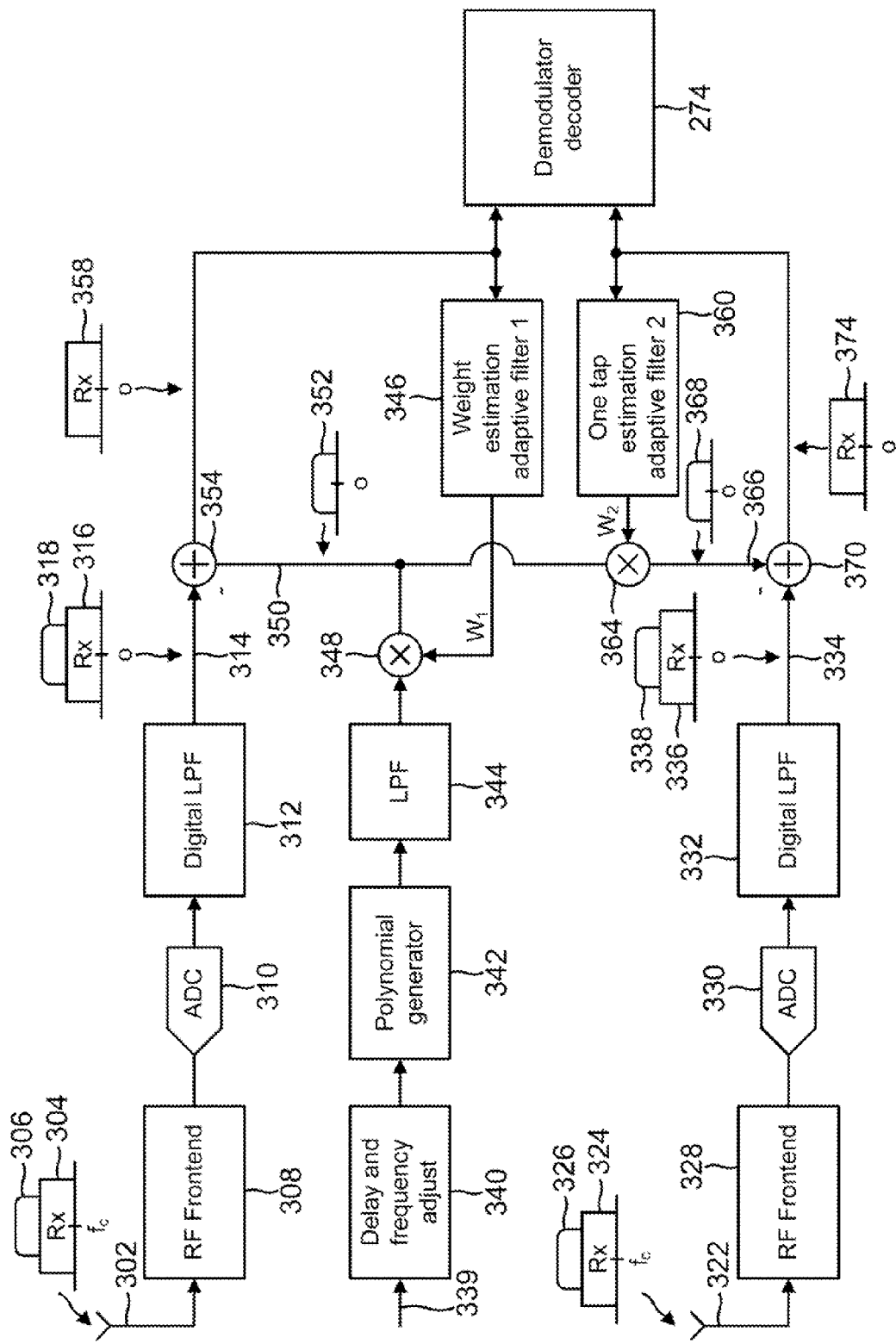
FIG. 3 shows a system block diagram used to implement a joint NLIC operation for two victim receivers to remove or mitigate multiple self-jamming interference signals from the same aggressor transmitter according to one or more embodiments of the present disclosure.

FIG. 3 shows a system block diagram used to implement a joint NLIC operation for two victim receivers to remove or mitigate multiple self-jamming interference signals from the same aggressor transmitter according to one or more embodiments of the present disclosure. The victim receivers may be victim receiver A 228 and victim receiver B 230 of FIG. 2 that receive self-jamming interference from aggressor transmitter 202.

A first victim receiver receives desired RF Rx signal 304 centered at Rx carrier frequency $f_c$ through antenna 302. The victim receiver also receives a self-jamming interference signal 306 in the Rx frequency band from an aggressor transmitter. An RF frontend 308, ADC 310, and digital LPF 312 processes, digitizes, and filters desired RF Rx signal 304 and interference signal 306 to generate a digital composite baseband Rx signal 314. Digital composite baseband Rx signal 314 contains a desired baseband Rx signal 316 and interference baseband signals 318. Interference baseband signal 318 is the baseband or near-baseband version of interference signal 306 received by antenna 302. Similarly, A second victim receiver receives desired RF Rx signal 324 centered at Rx carrier frequency $f_c$ and interference signal 326 from the aggressor transmitter. In one or more embodiments, the Rx carrier frequencies for the two victim receivers may be different. An RF frontend 328, ADC 330, and digital LPF 332 processes, digitizes, and filters desired RF Rx signal 324 and interference signal 326 to generate a digital composite baseband Rx signal 334. Digital composite baseband Rx signal 334 contains a desired baseband Rx signal 336 and interference baseband signals 338. Interference baseband signal 338 is the baseband or near-baseband version of interference signal 326 received by antenna 322.

The joint NLIC operation adaptively estimates interference baseband signals 318 and 338 using Tx signal 339 from the aggressor transmitter. The joint NLIC operation may sequence the estimation of the two interference baseband signals based on the level of interference measured by the two victim receivers. For example, during a quiet period when the victim receivers do not receive desired RF Rx signals 304 and 324, the victim receivers may measure the RSSIs of interference signals 306 and 326 received by antennas 302 and 322 from the aggressor transmitter. The interference baseband signal corresponding to the stronger interference signal may be estimated by the joint NLIC operation first. In one or more embodiments, the victim receivers may estimate the expected level of interference due to interference signals 306 and 326 on desired RF Rx signals 304 and 324 using calibrated data on antenna isolation between the aggressor transmitters and Rx antennas 302 and 322, respectively. The interference baseband signal for the victim receiver with the smaller antenna isolation data may be estimated by the joint NLIC operation first. In one or more embodiments, if the Rx carrier frequencies or the bandwidth of desired RF Rx signals 304 and 324 are different, the victim receivers may estimate the amount of interference power from interference signals 306 and 326 that is expected to overlap with the signal bandwidth of desired RF Rx signals 304 and 324, respectively. The expected level of interference may be determined based on antenna isolation data, Rx carrier frequencies and the bandwidth of desired RF Rx signals 304 and 324, and knowledge of the Tx parameters from the aggressor transmitter such as the transmitted power level, carrier frequency and bandwidth of Tx signal 339. The interference baseband signal corresponding to the interference signal expected to induce the stronger interference may be estimated by the joint NLIC operation first. If the Tx parameters from the aggressor transmitter changes, the joint NLIC operation may re-determine the expected level of interference from the interference signals and may rearrange the sequence for estimating the interference baseband signals.

Once the sequence for estimating the interference baseband signals in the two victim receivers is determined, the joint NLIC operation processes Tx signal 339 (i.e., digital Tx baseband IQ signal) from the aggressor transmitter to estimate the interference baseband signal corresponding to the stronger interference signal. In the embodiment depicted in FIG. 3, interference signal 306 is stronger than interference signal 326. As such, the joint NLIC operation estimates interference baseband signal 318 first. The joint NLIC operation includes a delay-and-frequency-adjust module 340 to insert programmable delays into Tx signal 339 from the aggressor transmitter to sample align the estimate of interference baseband signal 318 generated from the joint NLIC operation with the received interference baseband signals 318 contained in digital composite baseband Rx signal 314. Delay-and-frequency-adjust module 340 may also frequency adjust Tx signal 339 to remove any frequency offset between Tx signal 339 and interference baseband signal 318.

A polynomial generator module 342 reconstructs the non-linear components of interference baseband signal 318 using the delayed and frequency adjusted Tx signal. For example, polynomial generator module 342 may generate the second power and the fourth power of Tx signal 339. In one or more embodiments, polynomial generator module 342 may also generate linear components of Tx signal 339. A LPF module 344 low-pass filters the non-linear components of polynomial generator module 342. A multiplier-summer module 348 weighs the filtered non-linear components of polynomial generator module 342 using weight estimates $W_1$ from a weight vector estimation adaptive filter 1 module 346. Weight estimates $W_1$ may be a vector of complex values. Multiplier-summer module 348 sums the weighted non-linear components to generate an estimated interference baseband signal 350. In one or more embodiments, estimated interference baseband signal 350 may also contain a weighted linear component. Estimated interference baseband signal 350 may have interference power centered at the baseband as shown in signal 352.

A summer 354 subtracts estimated interference baseband signal 350 from digital composite baseband Rx signal 314 to generate a signal 358. Signal 358 contains desired baseband Rx signal 316 and a residual of interference baseband signal 318. Weight vector estimation adaptive filter 1 module 346 may adaptively change weight estimates $W_1$ to minimize the residual of interference baseband signal 318 contained in signal 358 using a minimum square error (MSE) algorithm. The MSE algorithm may be implemented as a least mean square (LMS) algorithm, recursive least square (RLS) algorithm, etc. Thus, the joint NLIC operation adaptively generates estimated interference baseband signal 350 that closely approximates the received interference baseband signal 318 to remove or mitigate interference baseband signal 318 from digital composite baseband Rx signal 314.

The interference signals 306 and 326 received by antennas 302 and 322, respectively, from the aggressor transmitter may differ by a complex gain that represents the amplitude/phase mismatch of the associated propagation paths from the aggressor transmitter to the two antennas. Similarly, it is assumed that the non-linear characteristics of RF frontends 308 and 328 may differ by only a complex gain. As such, the joint NLIC operation may estimate interference baseband signal 338 corresponding to the interference signal 326 by multiplying estimated interference baseband signal 350 corresponding to the interference signal 306 by a complex coefficient. The complex coefficient is represented by a weight estimate $W_2$ from a one-tap estimation adaptive filter 2 module 360. The weight estimate $W_2$ has an amplitude gain and a phase to compensate for the amplitude/phase mismatch between interference baseband signals 318 and 338 contained in digital composite baseband Rx signals 314 and 334, respectively.

A multiplier module 364 multiplies estimated interference baseband signal 350 by the weight estimate $W_2$ to generate an estimated interference baseband signal 366. Estimated interference baseband signal 366 is an estimate of interference baseband signal 338 and may have interference power centered at the baseband as shown in signal 368. A summer 370 subtracts estimated interference baseband signal 366 from digital composite baseband Rx signal 334 to generate a signal 374. Signal 374 contains desired baseband Rx signal 336 and a residual of interference baseband signal 338. One-tap estimation adaptive filter 2 module 360 may change the weight estimate $W_2$ to minimize the residual of interference baseband signal 338 so as to generate estimated interference baseband signal 366 that closely approximates the received interference baseband signal 338 to remove or mitigate interference baseband signal 338 from digital composite baseband Rx signal 334. Advantageously, the adaptive algorithm and the cost function used by one-tap estimation adaptive filter 2 module 360 to estimate the weight estimate $W_2$ may be flexibly chosen and may be simpler than those used by the full scale NLIC filter of weight vector estimation adaptive filter 1 module 346 to estimate weight estimates $W_1$. A demodulator-decoder module 274 demodulates and decodes signals 358 and 374 containing desired baseband Rx signal 316 and desired baseband Rx signal 336, respectively, to recover the desired Rx signal.

The joint NLIC operation may process Tx signal 339 from the aggressor transmitter on a sample by sample basis. In one or more embodiments, the joint NLIC operation may process Tx signal 339 in blocks of samples. As described, the programmable delay inserted by delay-and-frequency-adjust module 340 aligns the estimated interference baseband signal corresponding to the stronger interference signal generated by the joint NLIC operation with the received interference baseband signal. If there is a difference in delays between the two received interference baseband signals beyond a sampling delay, the joint NLIC operation may insert a delay to the estimate of the interference signal corresponding to the stronger interference signal prior to multiplication by the weight estimate $W_2$ to sample align the estimate of the second interference signal with its corresponding received interference baseband signal. For example, estimated interference baseband signal 350 may be delayed prior to multiplication by multiplier module 364 to compensate for the difference in delays between interference baseband signals 318 and 338. In one or more embodiments, if the sequence of estimation of the two interference baseband signals changes due to a change in the expected level of interference from interference signals 306 and 326, the joint NLIC operation may estimate interference baseband signal 338 first.

Figure 4:
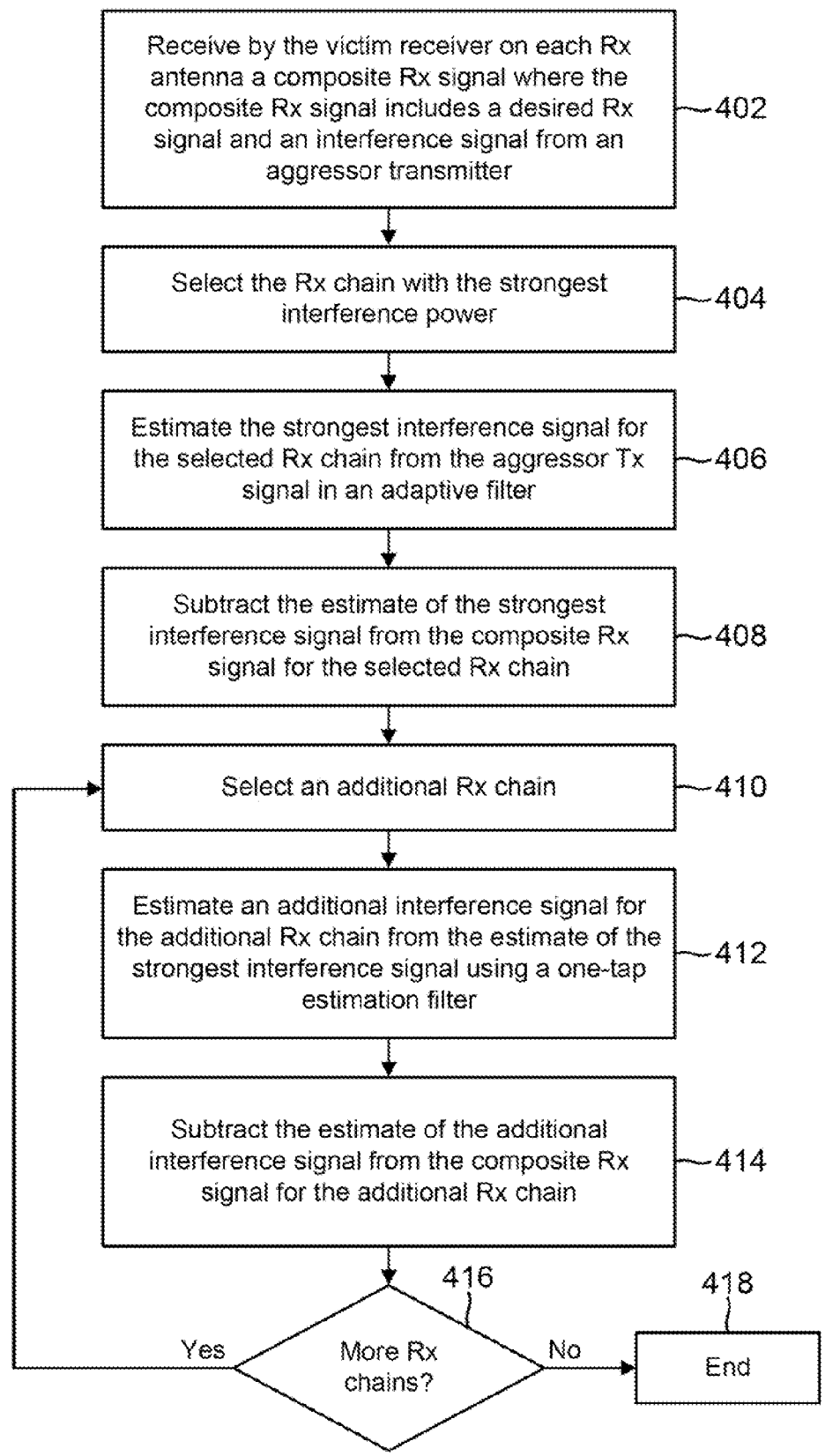
FIG. 4 shows a flow chart of a process for a joint NLIC operation to estimate and remove interference signals received by multiple victim receivers of a communication system according to one or more embodiments of the present disclosure.

FIG. 4 shows a flow chart of a process for a joint NLIC operation to estimate and remove interference signals received by multiple victim receivers of a communication system according to one or more embodiments of the present disclosure.

In 402, the victim receivers receive self-jamming interference signals from an aggressor transmitter on multiple receiver antennas. Rx chains of the victim receivers process the interference signals to generate a composite Rx signal for each victim receiver. The composite Rx signal for each victim receiver includes a desired Rx signal and an interference signal received. The composite Rx signal may be down-converted from an RF frequency down to baseband for NLIC processing. The interference signals may be due to non-linearities in the RF components of the Tx chain of the aggressor transmitter or in the RF components of the Rx chain of the victim receivers.

In 404, the victim receivers select the strongest of the interference signals received by the multiple receiver antennas as the interference signal for which to perform NLIC operation first. The strongest interference signal may be determined based on RSSI measurements of the interference signals received by each receiver antenna. In one or more embodiments, the strongest interference signal may be determined based on the expected level of interference introduced by the interference signals on the desired Rx signal of each victim receiver. The victim receivers may use calibrated antenna isolation data between the aggressor transmitter and the receiver antennas to estimate the interference level.

In 406, the joint NLIC operation estimates the interference signal contained in the composite Rx signal of the victim receiver receiving the strongest interference signal. The joint NLIC operation may reconstruct the interference signal as a weighted sum of polynomial terms of known Tx data received from the aggressor transmitter. The known Tx data may be digital Tx baseband signal received from the aggressor transmitter. A weight estimation adaptive filter may adaptively generate the weights that are multiplied with the polynomial terms to generate the weighted sum.

In 408, the joint NLIC operation subtracts the estimate of the strongest interference signal from the composite Rx signal of the victim receiver receiving the strongest interference signal to generate a signal that contains the desired Rx signal for the victim receiver and a residual of the strongest interference signal. The joint NLIC operation may minimize the residual of the strongest interference signal using a MSE algorithm to adjust the weights of the weight estimation adaptive filter so that the estimate of the strongest interference signal closely approximates the received interference signal.

In 410, after removing or mitigating the strongest interference signal, the joint NLIC operation selects an additional interference signal for which to perform the NLIC operation next. It is assumed that the interference signals contained in the composite Rx signals of the multiple victim receivers differ only in phase and/or gain.

In 412, the joint NLIC operation estimates the additional interference signal from the estimate of the strongest interference signal using a one-tap estimation adaptive filter. The one-tap estimation adaptive filter may generate a complex coefficient with a gain and a phase that is multiplied by the estimate of the strongest interference signal to compensate for the difference in complex gain between the strongest interference signal and the additional interference signal.

In 414, the joint NLIC operation subtracts the estimate of the additional interference signal from the composite Rx signal of the victim receiver receiving the additional interference signal to generate a signal that contains the desired Rx signal for the victim receiver and a residual of the additional interference signal. The joint NLIC operation may minimize the residual of the additional interference signal using an adaptive algorithm to adjust the complex coefficient of the one-tap estimation adaptive filter so that the estimate of the additional interference signal closely approximates the received interference signal.

In 416, the victim receiver determines if there is any additional interference signal to estimate and remove from the composite Rx signal of a victim receiver. If there is, the joint NLIC operation repeats 410, 412, and 414 to estimate the additional interference signal from the estimate of the strongest interference signal and to subtract the estimate of the additional interference signal from the composite Rx signal of the victim receiver receiving the additional interference signal until the interference signals in all victim receivers have been removed or mitigated.

It is contemplated that the methods identified herein may be implemented using one or more general purpose or specific purpose computers and/or computer systems, networked and/or otherwise. Where applicable, the sequencing of various steps described herein may be changed, combined into composite steps, and/or separated into sub-steps to provide features described herein.

It is also contemplated that various embodiments provided by the present disclosure may be implemented using hardware, firmware, software, or any combinations thereof. For example, the various modules of the analog frontends or the digital backend of FIG. 2 or 3 may be implemented by one or more processors, including but not limited to controllers and/or other processing components internal or external to the aggressor transmitter or the victim receivers. The processors may include a micro-controller, digital signal processor (DSP), or other processing components. The processors may perform specific operations by executing one or more sequences of instructions contained in system memory. Logic may be encoded in a computer readable medium, which may refer to any medium that participates in providing instructions to processors for execution. Such a medium may take many forms, including but not limited to, nonvolatile media, volatile media, and transmission media. In one embodiment, logic is encoded in non-transitory computer readable medium.

Although embodiments of the present disclosure have been described, these embodiments illustrate but do not limit the disclosure. For example, even though an one-tap estimation adaptive filter is used to generate a complex weight for estimating additional interference signals from the estimate of the strongest interference signal, embodiments of the present disclosure may encompass other types of adaptive filters. In addition, embodiments of the present disclosure may encompass cancelling or mitigating self-jamming interference introduced by intermodulation interference, or cross modulation of the RF Tx signals with other Tx frequencies or jammer. It should be understood that embodiments of the present disclosure should not be limited to the embodiments described but that numerous modifications and variations may be made by one of ordinary skill in the art in accordance with the principles of the present disclosure and be included within the scope of the present disclosure as hereinafter claimed.

What is claimed is:

1. A method for joint non-linear interference cancellation (NLIC) of interference signals received by a plurality of victim receivers, the method comprising:
   receiving a composite receive (Rx) signal via each of the plurality of victim receivers, wherein the composite Rx signal comprises a desired Rx signal, an interference signal, and noise from an aggressor transmitter;
   determining a ratio for each composite Rx signal, wherein the ratio is determined using an estimated interference signal power divided by a power of the desired Rx signal plus the noise;
   receiving a transmit (Tx) signal from the aggressor transmitter;
   selecting a first Rx antenna with a highest ratio from the plurality of victim receivers;
   generating an estimate of a first interference signal from the first Rx antenna using the Tx signal;
   generating an estimate of at least one additional interference signal from the estimate of the first interference signal; and
   removing the estimate of the first interference signal from a corresponding first composite Rx signal and the estimate of the at least one additional interference signal from a corresponding at least one additional composite Rx signals.

2. The method of claim 1, wherein said generating the estimate of the at least one additional interference signal comprises multiplying the estimate of the first interference signal by a complex coefficient to generate the estimate of the at least one additional interference signal.

3. The method of claim 2, wherein the complex coefficient comprises an amplitude gain and a phase, and wherein the complex coefficient is adaptively adjusted to compensate for a difference in the amplitude gain and the phase between the first interference signal and the at least one additional interference signal.

4. The method of claim 1, wherein said generating the estimate of the first interference signal comprises:
   constructing one or more polynomial terms of the Tx signal; and
   generating a weighted sum of the one or more polynomial terms using weight estimates from an adaptive filter to generate the estimate of the first interference signal.

5. The method of claim 4, wherein said removing the estimate of the first interference signal from the corresponding first composite Rx signal comprises:
   generating a residual of the first interference signal, and wherein said generating the estimate of the first interference signal further comprises adjusting the weight estimates of the adaptive filter to minimize the residual of the first interference signal.

6. The method of claim 1, further comprising:
   generating an estimate of remaining interference signals by multiplying the estimate of the first interference signal by a complex coefficient for each of the plurality of victim receivers, wherein the complex coefficient for each of the plurality of victim receivers is adjusted so that the estimate of each of the remaining interference signals approximates the interference signal received in a corresponding remaining composite Rx signal.

7. The method of claim 1, wherein the estimated interference signal power for the each of the plurality of victim receivers is determined by:
   measuring a received signal strength indicator (RSSI) of interference received by the each of the plurality of victim receivers.

8. The method of claim 1, wherein the estimated interference signal power for the each of the plurality of victim receivers is determined by:
   calibrating antenna isolation data between the aggressor transmitter and the each of the plurality of victim receivers.

9. The method of claim 1, wherein said generating the estimate of the at least one additional interference signal further comprises delaying samples of the estimate of the first interference signal before using the estimate of the first interference signal to generate the estimate of the at least one additional interference signal to compensate for a difference in delays between the first interference signal and the at least one additional interference signal.

10. A method for joint non-linear interference cancellation (NLIC) of interference signals received by a plurality of victim receivers, the method comprising:
    receiving a composite receive (Rx) signal via each of the plurality of victim receivers, wherein the composite Rx signal comprises a desired Rx signal and an interference signal from an aggressor transmitter;
    selecting, from the plurality of victim receivers, a first Rx antenna with a highest amount of estimated interference;
    receiving a transmit (Tx) signal from the aggressor transmitter;
    generating an estimate of the first interference signal from the first Rx antenna using the Tx signal;
    generating an estimate of at least one additional interference signal from the estimate of the first interference signal; and
    removing the estimate of the first interference signal from a corresponding first composite Rx signal and the estimate of the at least one additional interference signal from a corresponding at least one additional composite Rx signals.

11. The method of claim 10, wherein said generating the estimate of at least one additional interference signal comprises multiplying the estimate of the first interference signal by a complex coefficient to generate the estimate of the at least one additional interference signal.

12. The method of claim 11, wherein the complex coefficient comprises an amplitude gain and a phase, and wherein the complex coefficient is adaptively adjusted to compensate for a difference in the amplitude gain and the phase between the first interference signal and the at least one additional interference signal.

13. The method of claim 10, wherein said generating the estimate of the first interference signal comprises:
   constructing one or more polynomial terms of the Tx signal; and
   generating a weighted sum of the one or more polynomial terms using weight estimates from an adaptive filter to generate the estimate of the first interference signal.

14. The method of claim 13, wherein said removing the estimate of the first interference signal from the corresponding first composite Rx signal comprises:
   generating a residual of the first interference signal, and wherein said generating the estimate of the first interference signal further comprises adjusting the weight estimates of the adaptive filter to minimize the residual of the first interference signal.

15. The method of claim 10, further comprising:
   generating an estimate of remaining interference signals by multiplying the estimate of the first interference signal by a complex coefficient for each of the plurality of victim receivers, wherein the complex coefficient for each of the plurality of victim receivers is adjusted so that the estimate of each of the remaining interference signals approximates the interference signal received in a corresponding remaining composite Rx signal.

16. The method of claim 10, wherein said selecting the first Rx antenna comprises:
   measuring a received signal strength indicator (RSSI) of interference received by each of the plurality of victim receivers; and
   determining the estimated interference for each of the plurality of victim receivers based, at least in part, on the RSSI.

17. The method of claim 10, wherein said selecting the first Rx antenna comprises:
   calibrating antenna isolation data between the aggressor transmitter and each of the plurality of victim receivers; and
   determining the estimated interference for each of the plurality of victim receivers based, at least in part, on the antenna isolation data.

18. The method of claim 10, wherein said generating the estimate of the at least one additional interference signal further comprises delaying samples of the estimate of the first interference signal before using the estimate of the first interference signal to generate the estimate of the at least one additional interference signal to compensate for a difference in delays between the first interference signal and the at least one additional interference signal.

19. A system comprising:
   a non-transitory memory storing machine-readable instructions for a nonlinear interference cancellation (NLIC) operation; and
   one or more hardware processors configured to execute the machine-readable instructions which, when executed by the one or more hardware processors, cause the system to:
      receive a composite receive (Rx) signal at each of a plurality of victim receivers, wherein the composite Rx signal comprises a desired Rx signal and an interference signal from an aggressor transmitter;
      select, from the plurality of victim receivers, a first Rx antenna with a highest amount of estimated interference;
      receive a transmit (Tx signal from the aggressor transmitter;
      generate an estimate of a first interference signal from the first Rx antenna and the Tx signal using the NLIC operation;
      generate an estimate of at least one additional interference signal from the estimate of the first interference signal using the NLIC operation; and
      remove the estimate of the first interference signal from a corresponding first composite Rx signal and the estimate of the at least one additional interference signal from a corresponding at least one additional composite Rx signals using the NLIC operation.

20. The system of claim 19, wherein the machine-readable instructions, when executed by the one or more hardware processors, further cause the system to:
   generate an estimate of remaining interference signals by multiplying the estimate of the first interference signal by a complex coefficient for each of the plurality of victim receivers, wherein the complex coefficient for each of the plurality of victim receivers is adjusted so that the estimate of each remaining interference signal approximates the interference signal received in a corresponding remaining composite Rx signal.

* * * * *